United States Patent Office 3,493,801
Patented Feb. 3, 1970

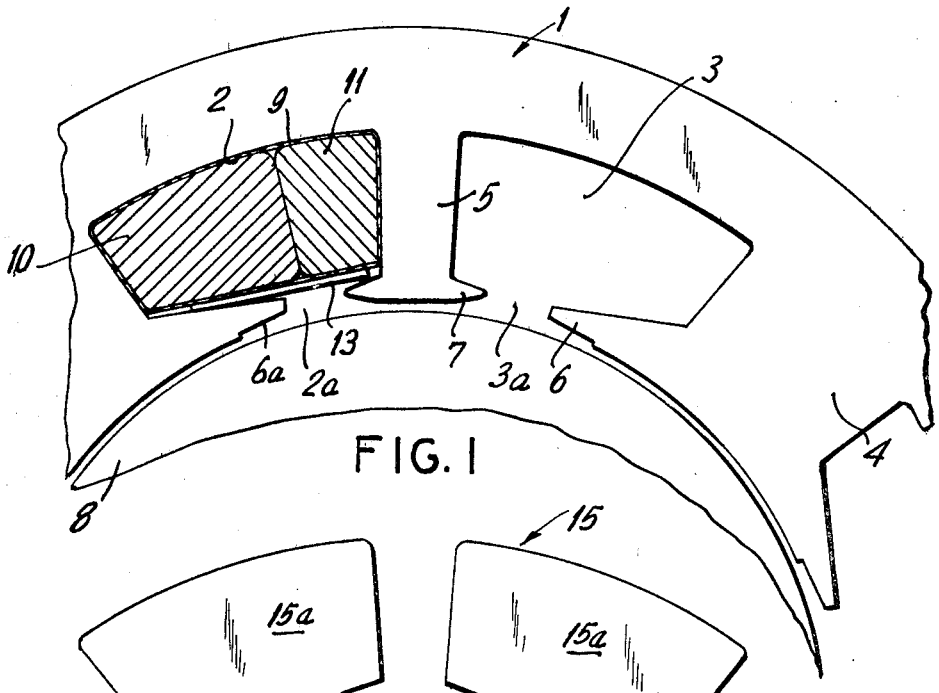
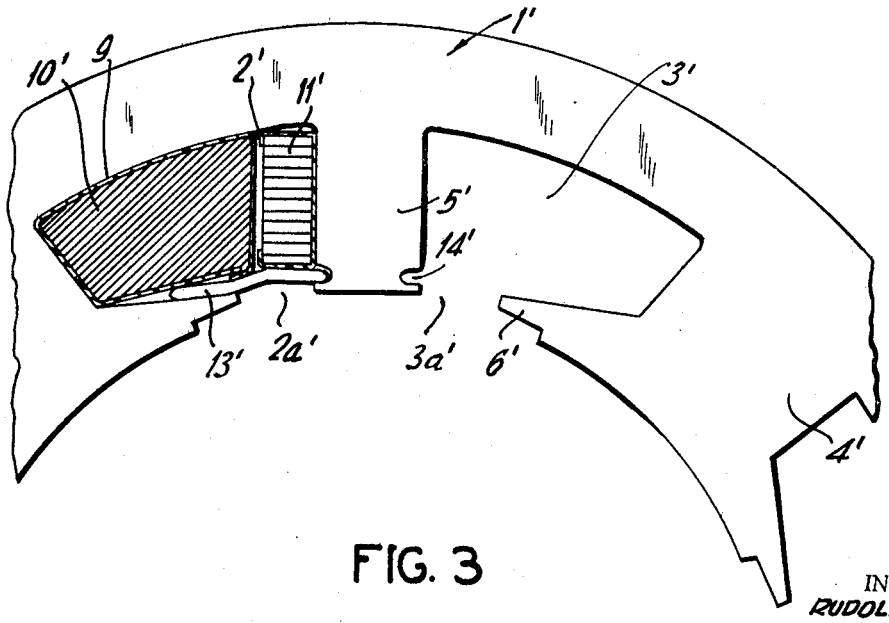

3,493,801
D.C. ELECTRICAL MACHINE
Rudolf Walser, Zurich, Switzerland, assignor to
Maschinenfabrik Oerlikon, Zurich, Switzerland
Filed Nov. 21, 1967, Ser. No. 684,731
Claims priority, application Switzerland, Jan. 18, 1967,
827/67
Int. Cl. H02k *3/48, 3/16, 19/26*
U.S. Cl. 310—186                                    7 Claims

ABSTRACT OF THE DISCLOSURE

A stator for a D.C. electrical machine is formed of individual plates in which slots are fashioned between the main poles and the reversing poles of the stator. At the opening to the slots the distance between the opposed surfaces of the main and reversing poles is less than within the slot. The partially closed or reduced size opening of the slot may be formed of either or both a main pole tip and a reversing pole tip extending toward the surface of the opposite pole. The plates are stacked with the slots in alignment, next insulation is deposited on the surfaces forming the slot, and then the main pole winding and the reversing pole winding are placed in the slots, preferably by dropping them in. The windings substantially fill the slot and a key is inserted into the slot to secure the windings in place. In one arrangement, where the reversing pole does not have a tip the key is fitted into a groove in the reversing pole.

SUMMARY OF THE INVENTION

The present invention is directed to a D.C. electrical machine in the power range from a few kilowatts to several hundred kilowatts and, more particularly, it is directed to a stator construction formed of individual plates with gaps between the main and reversing poles produced by punching out a slot in the stator plate.

D.C. electrical machines normally have a solid stator yoke with laminated main poles attached to it by screws and generally solid reversing poles formed on the yoke. This conventional stator construction provides the magnetic remanence necessary for the self-excitation of the generators, and in addition, it affords adjustability of both the main pole and the reversing pole air gaps as, for example, by means of corresponding plate shims. However, where rapid load changes occur, these machines exhibit an unfavorable commutation effect. Moreover, such machines do not readily permit the use of static feeding devices which supply a pulsating D.C. voltage.

D.C. electrical machines have been known in the art in which the stator circuit is designed as a stack of individual sheets or plates. However, in this arrangement, the individual sheets have been arranged without pole tips on the main and reversing poles to permit the placement of prefabricated windings or coils on the poles from the rotor bore. These machines have a magnetic circuit as is necessary in view of satisfactory commutation in reversals and feeding with ripple current, but the electrical utilization remains relatively small.

The drawbacks of these machines known in the art can be avoided if the gap or space between the main pole and the reversing pole has the form of a slot in which the spacing between the opposed surfaces at the opening to the slot is relatively much smaller than the spacing within the slot, and where the slot is filled by the main pole and the reversing pole windings. Preferably, in this arrangement, at least the main pole winding is of the drop-in type, that is a winding which can be dropped into the slots of the stator instead of having to be pushed through from the end.

In accordance with the present invention, the method of producing the stator plates includes the steps of punching the plate with a tool to form the stator slot and to form the pole tips and the air gap between both the main pole and reversing pole and the rotor. After the stator slot has been formed, the rotor plate is severed by a second punching tool and then the plates are stacked with the slots in proper alignment, next the slots are insulated and then the windings are dropped into the slots and secured in place by means of keys or the like.

One of the advantages gained by the invention is the increased utilization of the electrical machine. The greater pole covering has the effect of a greater magnetic flux and the magnetic circuit can be better utilized, since higher inductions can be selected in the reversing pole cores. Furthermore, the production costs decrease considerably due to the use of drop-in windings. Furthermore, it is possible to utilize normal standard housings for asynchronous machines even for D.C. machines. Finally, savings are possible because the size of the plate contour used for forming the stator and rotor is similar with that of the asynchronous machine.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a partial view of a stator and rotor arrangement in accordance with the present invention;

FIG. 2 is a view of a punching tool for forming the stator slots illustrated in FIG. 1; and FIG. 3 is an alternate embodiment of a stator generally similar to that shown in FIG. 1.

DETAILED DESCRIPTION OF THE PREFERRED EMBODIMENTS

In FIG. 1, a portion of a stator plate 1 is illustrated concentrically disposed about a rotor 8. Stator slots 2, 3 are disposed between a main pole 4 and a reversing pole 5. Each of the slots 2, 3 has an opening 2a, 3a disposed closely adjacent to the rotor 8. At the openings 2a, 3a a main pole tip 6 and a reversing pole tip 7 extend laterally from the main pole and reversing pole, respectively, toward one another. Due to the provisions of the pole tips 6, 7, the spacing between the opposing surface of the main pole and the reversing pole are much less at the openings 2a, 3a than within the slots themselves.

Within the slot, insulation 9 surrounds a main pole winding 10 and a reversing winding 11. Just inwardly of the opening to the slot a key 13 holds the windings in place and bears against the pole tips 6, 7, and it will be noted that the windings substantially fill the space within the slot.

In assembling the stator, the plates 1 are stacked in a known manner with the slots in alignment; then the insulation 9 is applied to the interior surface of the slots and the main pole winding 10 as well as the reversing pole winding 11 are dropped into position in the slot. It is preferable to pre-wind the windings or coils 10 and 11 outside of the electrical machine and then to properly space and introduce them through the openings 2a, 3a into the slots 2, 3. After the windings are in place they are sealed and impregnated. For the optimum utilization of the electrical machine, it is preferred if the slots are substantially filled with the windings so that the key 13 fits tightly between the windings and the opposed inner surfaces of the tops 6, 7 of the main pole and the reversing pole.

In FIG. 2, a punching tool 15 is shown for forming the slots 2, 3 and the openings 2a, 3a to the slots. Though it may have only one main section 15a, the tool 15, shown in FIG. 2, has two main sections 15a for forming the slots 2, 3 and it has web portions 15b extending below the main sections 15a for forming or shaping the pole tips 6, 7 of the main pole and reversing pole respectively. By means of the punching tool the main pole 4 and the reversing pole 5 and their pole tips 6 and 7 can be formed in the plate by punching out of the material which forms the slots 2 and 3. The web sections 15b of the punching tool 15 form the air gap and the space 6a between the rotor and the stator. After the slots have been formed, the rotor plate is severed from the remainder of the plate by a second punching operation.

In FIG. 3, another embodiment of a stator plate 1' is illustrated having an arrangement generally similar to that in FIG. 1. Slots 2', 3' are formed in the stator plate 1' disposed between the main pole 4' and the reversing pole 5'. While the main pole has a tip 6' similar to that shown in FIG. 1, there is no tip provided on the reversing pole; however, the shape of the reversing pole is somewhat different so that the space between the main pole tip 6' and the reversing pole 5' still provides an opening 2a', 3a' which is considerably less than the spacing between the opposed main pole and reversing pole surfaces within the slots 2', 3'. Insulation 9' is provided about the main pole winding 10' and the reversing pole winding 11' within the slots. Grooves 14' are provided in the reversing pole facing toward the main pole tip 6'. As with the arrangement in FIG. 1, the windings substantially fill the slots 2', 3' and the key 13' which holds the windings in place, is secured along one edge within the groove 14' in the reversing pole 5'. While the main winding 10' is of the drop-in type, the reversing pole winding 11' is of the edgewise wound type and this form of winding is of particular advantage in machines about 50 kw. or more. As far as utilization is concerned, however, the arrangement shown in FIG. 1 is preferable to that shown in FIG. 3.

While specific embodiments of the invention have been shown and described in detail to illustrate the application of the inventive principles, it will be understood that the invention may be embodied otherwise without departing from such principles.

What is claimed is:

1. In a stator for a direct current electrical machine comprising a bundle of similar annularly shaped individual sheets, each of said sheets comprising a yoke extending about the outer periphery of said sheet and a number of alternating main poles and reverse poles extending inwardly from the yoke, wherein the improvement comprises each said sheet having slots separating the adjacent said main and reversing poles, at least each said main pole having a tip extending laterally toward said reversing pole at the inner end of said main pole, whereby the entrances to said slots have a smaller dimension between the adjacent surfaces of said main pole and reversing pole than the spacing between said main pole and reversing pole within said slots, a main pole winding and a reversing pole winding located within each of said slots, at least said main pole windings being drop-in windings, and a key member fitted within each of said slots in the entrance thereto inwardly from said main pole tip for securing said main and reversing windings in position.

2. In a stator, as set forth in claim 1, wherein said reversing pole has a groove therein within said slot facing toward the adjacent said main winding, the groove being closely spaced from the opening into said slot, and said key member being fitted into the groove and extending therefrom across the opening to said slot.

3. In a stator, as set forth in claim 1, wherein a tip extending laterally from each of said reversing poles toward the adjacent said main pole tip and being spaced laterally from said main pole tip with the spacing therebetween forming the opening into said slot, and said key member extending across the opening to said slot and being supported on the opposite sides thereof by said main pole tip and said reversing pole tip.

4. In a stator, as set forth in claim 1, wherein said reversing pole is a drop-in winding.

5. In a stator, as set forth in claim 1, wherein a layer of insulation is disposed between said main pole winding and reversing pole winding and the juxtaposed surfaces of said said main pole and reversing pole within said slot.

6. A method of forming a stator for a D.C. electrical machine from a plate section comprising the steps of punching a slot in the plate section for forming a stator slot disposed between a main pole and a reversing pole and also for forming an air gap between the stator and the rotor, severing the rotor portion of the plate from the stator, stacking the plates with the slots in alignment, insulating the surfaces within the slots, and dropping the windings into the slot.

7. A method of forming a stator, as set forth in claim 6, comprising the step of locking the windings in place within the slot in the stator.

References Cited

UNITED STATES PATENTS

| 1,173,153 | 2/1916 | Stull | 310—194 |
| 2,092,058 | 9/1937 | Ferris | 310—194 |
| 2,130,843 | 9/1938 | Hill | 310—194 |
| 2,235,075 | 3/1941 | Kimball | 310—184 |
| 2,575,705 | 11/1951 | Clokey | 310—258 |
| 2,777,080 | 1/1957 | Kitzmiller | 310—158 |
| 3,056,896 | 10/1962 | Ludemann | 310—258 |

WARREN E. RAY, Primary Examiner

R. SKUDY, Assistant Examiner

U.S. Cl. X.R.

310—214